(12) United States Patent  (10) Patent No.: US 7,788,721 B2
Suzuki et al.                (45) Date of Patent:     Aug. 31, 2010

(54) TRAFFIC CONTROL METHOD, APPARATUS, AND SYSTEM

(75) Inventors: Shinsuke Suzuki, Yokohama (JP); Toshio Shimojo, Sagamihara (JP)

(73) Assignee: Alaxala Networks Corporation, Kanagawa (JP)

( * ) Notice: Subject to any disclaimer, the term of this patent is extended or adjusted under 35 U.S.C. 154(b) by 688 days.

(21) Appl. No.: 11/621,631

(22) Filed: Jan. 10, 2007

(65) Prior Publication Data

US 2007/0177600 A1    Aug. 2, 2007

(30) Foreign Application Priority Data

Jan. 30, 2006   (JP) .............................. 2006-019978

(51) Int. Cl.
    *H04J 3/16*     (2006.01)
(52) U.S. Cl. .......................................... 726/22; 370/465
(58) Field of Classification Search ................. 370/465, 370/466, 473, 471
    See application file for complete search history.

(56) References Cited

U.S. PATENT DOCUMENTS

| 7,411,964 | B2 |    | 8/2008  | Suemura        |         |
|-----------|----|----|---------|----------------|---------|
| 7,565,693 | B2 | *  | 7/2009  | Shin et al.    | 726/23  |
| 7,660,290 | B2 |    | 2/2010  | Nagami et al.  |         |
| 2003/0229703 | A1 | * | 12/2003 | Falola et al.  | 709/229 |
| 2004/0052251 | A1 | * | 3/2004  | Mehrotra et al.| 370/389 |
| 2005/0210533 | A1 | * | 9/2005  | Copeland et al.| 726/23  |
| 2006/0126659 | A1 | * | 6/2006  | Baum et al.    | 370/466 |
| 2006/0174342 | A1 | * | 8/2006  | Zaheer et al.  | 726/23  |
| 2007/0058631 | A1 | * | 3/2007  | Mortier et al. | 370/392 |
| 2007/0157306 | A1 | * | 7/2007  | Elrod et al.   | 726/14  |

FOREIGN PATENT DOCUMENTS

| JP | 2002271372  | 9/2002  |
| JP | 2002-344492 | 11/2002 |
| JP | 2005311458  | 11/2005 |

OTHER PUBLICATIONS

P. Phaal, et al. "A Method for Monitoring Traffic in Switched and Routed Networks", IETF RFC31776, Sep. 2001.
B. Claise, et al., "Cisco Systems NetFlowServices Export Version 9", IETF RFC3954, Oct. 2004.
T. Holland, "Understanding IPS and IDS", Feb. 2004, URL:http://www.sans.org/reading_room/whitepapers/detection/1381.php.
Official Action issued in Japanese Patent Application No. 2006-019978 on Apr. 6, 2010.

* cited by examiner

*Primary Examiner*—Chi H Pham
*Assistant Examiner*—Fan Ng
(74) *Attorney, Agent, or Firm*—Antonelli, Terry, Stout & Kraus, LLP.

(57) ABSTRACT

Flow information of excessive traffic detected by a traffic monitor of a packet forwarding apparatus is entirely delivered to a manager server. By combining input/output port information of the flow and topology information, the manager server calculates from where the flow is inputted and to where the flow is outputted. By further combining results of judgment of traffic contents, the manager server controls the traffic at an optimal position according to the traffic contents. The problems of inefficiency can be avoided by managing the flow information by the manager server in a concentrated way. Adding the flow information to the network topology drawing for each flow, it is possible for the network administrator to more easily understand the statuses of flows on the network.

7 Claims, 9 Drawing Sheets

FIG.5

| FLOW ID | DEVICE | INPUT PORT | OUTPUT PORT | LAST UPDATE TIME |
|---|---|---|---|---|
| #1 | S1 | Port8 | Port4 | 2005/01/01 00:00:00 |
| #1 | S2 | Port10 | Port1 | 2005/01/01 00:00:01 |
| #2 | S3 | Port3 | Port1 | 2005/01/01 03:05:05 |
| #2 | S2 | Port13 | Port1 | 2005/01/01 03:05:50 |
| #3 | S1 | Port2 | Port4 | 2005/01/01 05:10:00 |
| #3 | S2 | Port10 | Port13 | 2005/01/01 05:10:01 |
| #3 | S3 | Port1 | Port5 | 2005/01/01 05:10:02 |
| #4 | S1 | Port8 | Port4 | 2005/01/01 04:30:00 |
| #4 | S2 | Port10 | Port13 | 2005/01/01 04:30:00 |

FIG.6

| DEVICE | COMMAND CONTENTS | LAST WITHDRAWAL TIME |
|---|---|---|
| S1 | drop from 3.4.5.6 to 8.9.10.11 at port 4 outbound | 2005/01/01 00:15:00 |
| S2 | drop from 4.5.6.7 to 9.10.11.12 at port 13 outbound | 2005/01/01 04:45:00 |
| S2 | limit from 2.3.5.6 to 7.8.9.10 at port 8 within 10Mbps inbound | 2005/01/01 00:15:01 |
| S3 | limit from 5.6.7.8 to 9.10.11.12 at port 3 within 0Mbps inbound | 2005/01/01 05:00:00 |

———— Flow#1  2.3.5.6 : 10000 → 7.8.9.10 : http (NORMAL)

════ Flow#2  5.6.7.8 : 20000 → 9.10.11.12 : 1443 (Worm#3493)

TRAFFIC CONTROL METHOD, APPARATUS, AND SYSTEM

INCORPORATION BY REFERENCE

The present application claims priority from Japanese application JP2006-019978 filed on Jan. 30, 2006, the content of which is hereby incorporated by reference into this application.

BACKGROUND OF THE INVENTION

The present invention relates to a communication control technique for internet communication, and in particular, to a network control technique.

While the internet is being developed and broadly employed as infrastructure of the society today, there arises quite a serious issue, namely, the serious network attack in which computer viruses and worms as well as malignant users attack servers on the internet.

It is desirable to take a measure against a network attack at a point near the place where the attack traffic actually takes place. This is because the attack traffic is transmitted to a plurality of servers in many cases. In addition, it is required to determine the source of the attack traffic according to actual flow information of the attack traffic. In many cases, Internet Protocol (IP) header information such as a source IP address is misrepresented and hence the actual source of the attack traffic cannot be determined. In general, the flow information of the attack traffic is detected by use of a combination of a flow information extraction technique (port mirror, sflow, NetFlow, etc.) and a flow contents analysis technique (reference is to be made to, for example, (1) IETF RFC3176 "In Mon Corporation's sFlow: A Method for Monitoring Traffic in Switched and Routed Networks" or (2) IETF RFC3954 "Cisco Systems NetFlow Services Export Version 9").

In consideration of these aspects of the network attack, there exist two measures against the network attack, i.e., Anomaly-based Intrusion Prevention System (IPS) and Traffic Engineering.

Anomaly-based IPS is a technique to check an anomaly or abnormality in the contents of traffic and is implemented by a device capable of measuring and filtering the traffic. In a case in which the traffic in a device is measured and abnormal traffic is detected as a result, it is possible to prevent the abnormal traffic from flowing through the network by filtering the traffic in the device (reference is to be made to "Understanding IPS and IDS", Ted Holland, 2004/02, URL:

http://www.sans.org/reading_room/whitepapers/detection/1381.php. In this regard, the technique is actually implemented in two types of configurations. In the first type, one device conducts the measurement and the filtering. In the second type, two separate devices conduct the measurement and the filtering, respectively.

Traffic Engineering is a technique to check an abnormality in the rate of flow of traffic and is realized by a device capable of measuring the traffic and capable of controlling the traffic flow. In a case in which the traffic in a device is measured and traffic of an abnormal rate of traffic flow is detected, it is possible to prevent the abnormal traffic from affecting normal traffic by appropriately controlling the flow associated with the abnormal traffic by, for example, MPLS (reference is to be made to JP-A-2002-344492).

SUMMARY OF THE INVENTION

The conventional techniques of measures against attacks from the internet prepared on the basis of the traffic measurement are attended with, for example, three problems.

First, since a large number of forwarding apparatuses conduct one and the same security measurement, the calculation resource of the forwarding apparatuses is not efficiently used. According to anomaly-based IPS, if an abnormality is detected by a plurality of forwarding apparatuses for a particular flow, all forwarding apparatuses conduct the filtering. On the other hand, according to Traffic Engineering, to detour a particular flow, it is required that one and the same route control rule is applied to all forwarding apparatuses on the route of the flow. Additionally, for each forwarding apparatus, the number of available route control rules is limited, and hence it is required to efficiently use the route control rules within the limited number thereof.

Second, the calculation resource of the forwarding apparatuses is not efficiently used by independently conducting several types of traffic control operations such as Traffic Engineering and anomaly-based IPS. If Traffic Engineering is conducted independently of anomaly-based IPS, the traffic measurement is to be carried out for anomaly-based IPS independently of the traffic measurement for the Traffic Engineering. Therefore, the processing load of the traffic measurement is doubled in the forwarding apparatus. Moreover, in Traffic Engineering, the path calculation is conducted also for the traffic which will be vanished or filtered by anomaly-based IPS. That is, for the traffic to be filtered, the Traffic Engineering processing is executed. This is unnecessary processing.

Third, there takes place inefficient packet relay due to the residual of unnecessary traffic control. In a case in which traffic control is performed for a particular flow using Traffic Engineering, anomaly-based IPS, and the like, even if the flow is vanished, the traffic control operations (such as the filtering and the path control) are kept remained. Therefore, even in a situation in which the traffic control is not required, the control is continuously carried out. Furthermore, for each forwarding apparatus, the number of available traffic control operations is limited, and hence it is required not to reduce the number thereof by such unnecessary continuation of the control operations.

To overcome the difficulty, there is provided, for example, a scheme as below.

Information of abnormal traffic detected in forwarding apparatuses is controlled by a manager server in a centralized way. The manager server includes five components, i.e., topology information indicating linkages between ports in each forwarding apparatuses, interfaces for issuing instructions to respective forwarding apparatuses, a flow control command table to store the contents of commands, an engine to judge anomaly in the contents of traffic, and a graphic system to draw topology information.

The manager server manages the received information for each flow and extracts therefrom a relationship between information caused by a particular flow, a port associated with the information, a port thereof to input the information, and a port thereof to output the information. By combining the input and output ports of the flow and the topology information, the manager server calculates an input port and an output port of the entire flow.

For the calculated flow, the topology graphic system draws the intervals between the network forwarding apparatuses through which the flow passes, in the sequence in which the flow passes the forwarding apparatuses.

If it is determined as a result of the calculation that the flow forms a loop, the manager server disconnects a particular one of the links constituting the flow. If it is determined that the flow is stopped by a particular forwarding apparatus, that is, the flow is not relayed through the forwarding apparatus, the manager server requests a forwarding apparatus on the upstream side of the pertinent forwarding apparatus to filter the traffic. In this regard, the loop detection protocol such as Spanning Tree Protocol (STP) does not appropriately function if a protocol packet does not reach an adjacent forwarding apparatus due to excessive traffic. This can be avoided by the present scheme.

In a situation in which the flow passes from an end port of a first network to an end port of a second network, the processing is changed according to presence or absence of abnormality in the traffic contents. If the contents are abnormal, a request to discard the flow is issued to a forwarding apparatus of the first network as the starting point. If the contents are normal, a request to narrow the band of the flow is issued to the forwarding apparatus of the first network.

At issuance of each request, the contents of the request and a point of time to remove or withdraw the request are recorded in the flow control command table. When the time arrives, a request is issued to withdraw the flow control command thus issued for the request.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing an example of a topology information table.

FIG. 5 is a diagram showing an example of a detection flow information table.

FIG. 6 is a diagram showing an example of a flow control command table.

DESCRIPTION OF THE EMBODIMENTS

Description will now be given of an embodiment of the present invention. However, the present invention is not restricted by the embodiment.

Figure 1:
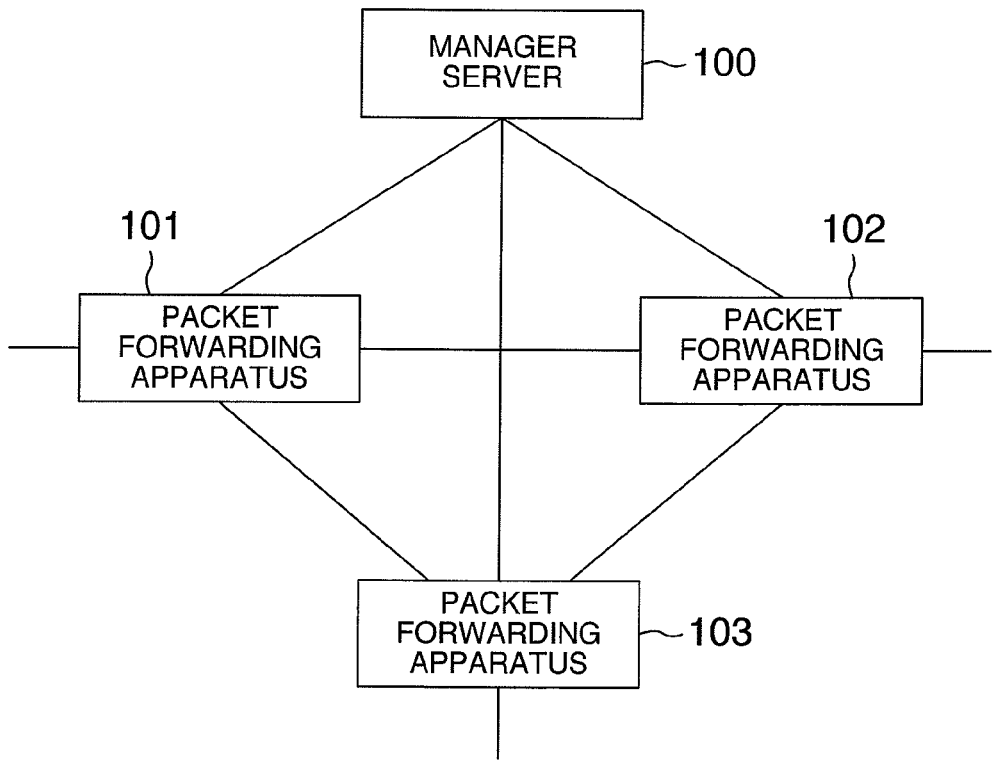
FIG. 1 is a diagram showing an example of a network configuration in an embodiment of the present invention.

FIG. 1 shows a network configuration example of the embodiment. The network configuration includes packet forwarding apparatuses 101 to 103 each of which includes a traffic monitor as a function to monitor the flow and a manager server 100 which receives monitor information (flow information) obtained by the traffic monitor to manage the information in a centralized way. The constituent components 100 to 103 are mutually connected via the network. The packet forwarding apparatus is, for example, a router or a switch. In the description, "traffic", "flow", or "traffic flow" indicates a flow of a data packet, and "flow information" is information capable of identifying a flow. For example, the flow information includes a source address of a flow, a destination address of the flow, a protocol number (TCP, UDP, or the like) of the flow, and protocol detailed information (such as port information of Transmission Control Protocol (TCP) and User Datagram Protocol (UDP)). By extracting these information items from the header information of the packet, it is possible to determine a particular flow to which the packet belongs. In addition, "flow" indicates a stream of data moving via a network between a source party and a destination party (such as two Local Area Network (LAN) stations). A plurality of flows may propagate through one single communication line depending on cases.

Figure 2:
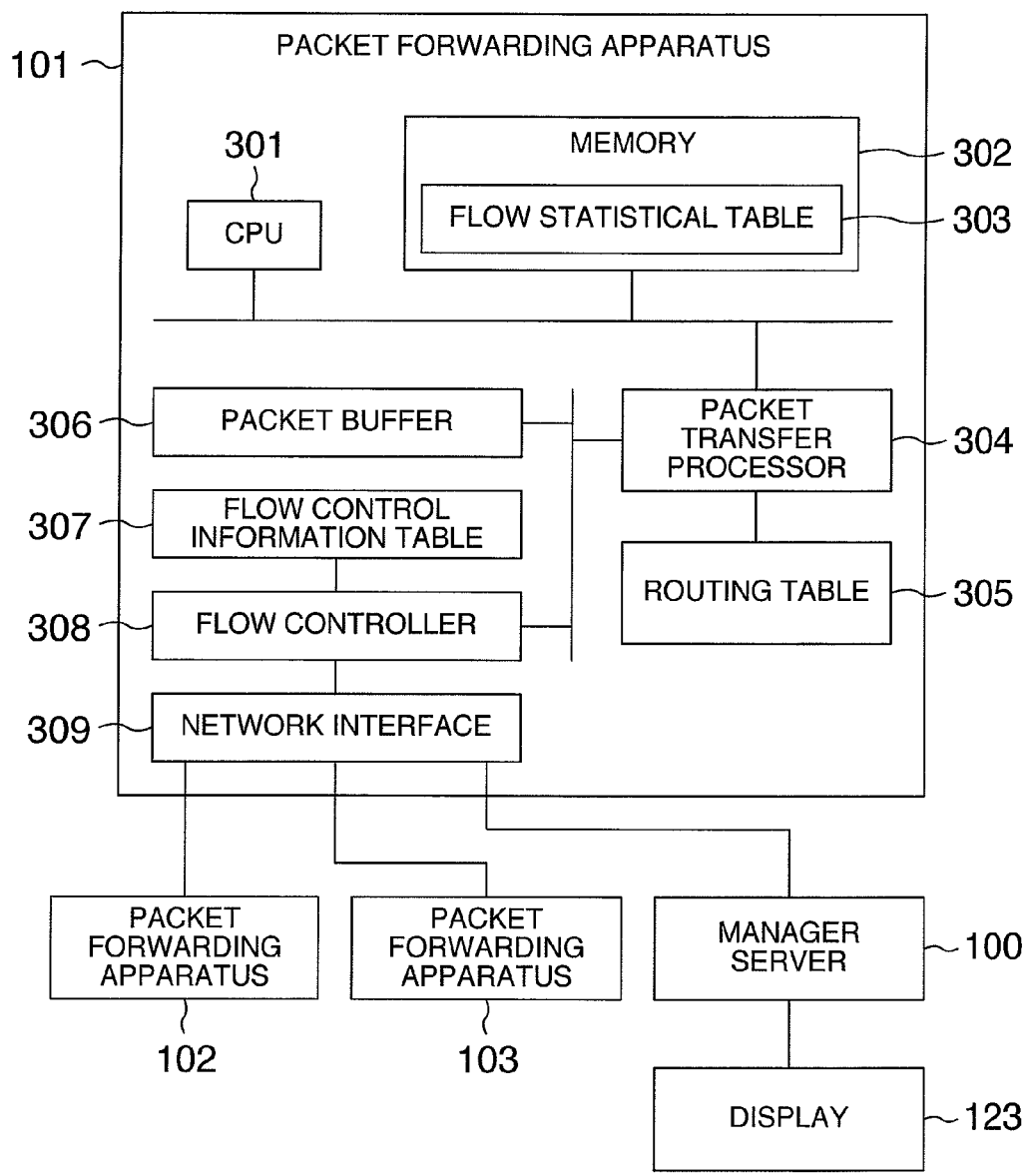
FIG. 2 is a block diagram showing an example of an internal construction of a packet forwarding apparatus.

FIG. 2 shows an internal construction of the packet forwarding apparatus 101. The forwarding apparatus 101 is connected via a network interface 309 to the other packet forwarding apparatuses 102 and 103 and the manager server 100. The network interface 309 includes a plurality of ports. A packet inputted from a particular port (first port) of the network interface 309 is processed by a flow controller 308 and is then stored in a packet buffer 306. A packet processor 304 determines a destination of the packet according to the contents of a routing table 305 and outputs the packet from the packet buffer 306 via the flow controller 308 to the network interface 309. In this regard, the constructions of the packet forwarding apparatuses 102 and 103 are similar to that of the packet forwarding apparatus 101. The traffic monitor described above corresponds to the flow controller 308, a flow statistic table 303, and a Central Processing Unit (CPU) 301.

In the flow controller 308, each of the input and output packets is filtered and/or shaped according to a flow control information table 307. Also, information of input and output ports of a flow having passed therethrough and information of the packet header of the packet are stored in the flow statistic table 303 in a memory 302. The CPU 301 of the packet forwarding apparatus selects and delivers appropriate information from the information of the flow statistic table 303 to the manager server 100 using a protocol such as sflow or NetFlow. The flow information to be delivered is determined according to the flow control information table 307. In the description, flow information of a flow with a flow rate equal to or more than a threshold value and flow information of a flow which continues exceeding a predetermined period of time are delivered to the manager server 100.

Figure 3:
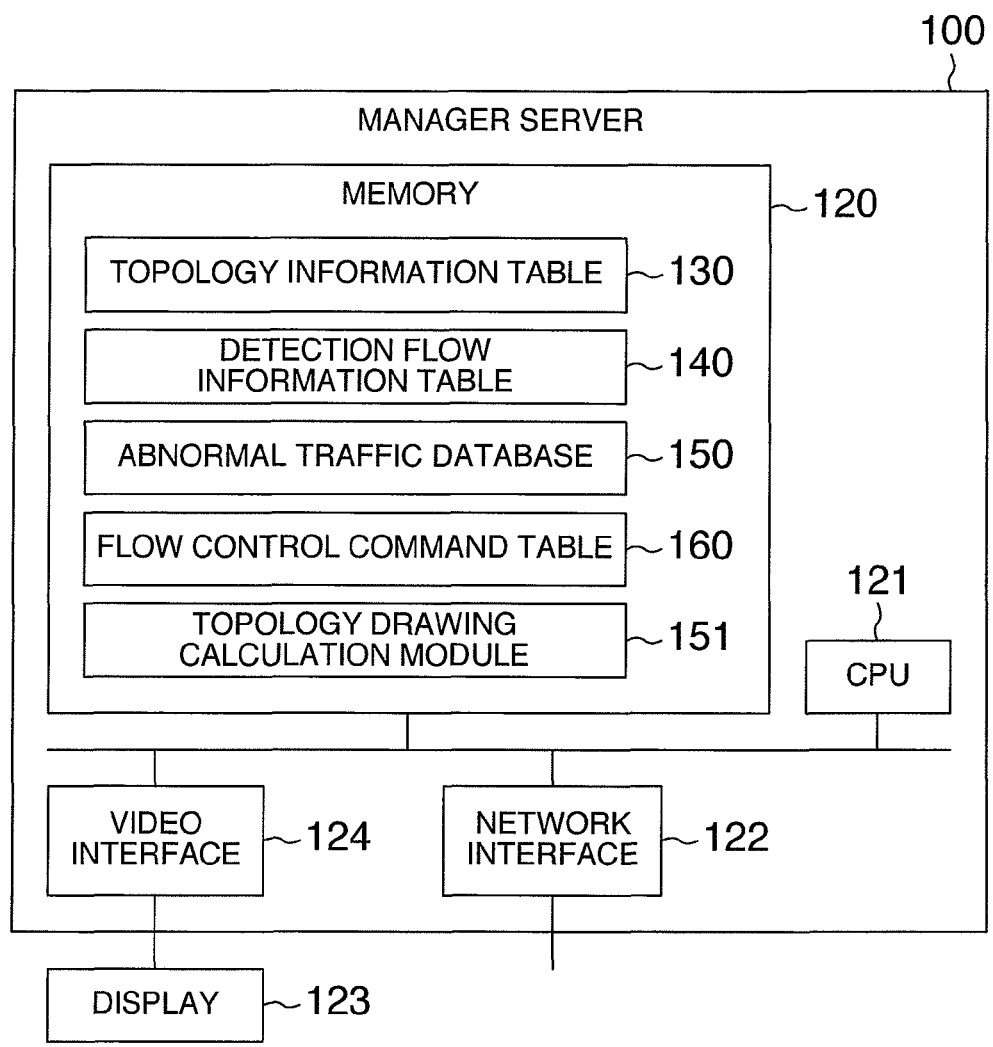
FIG. 3 is a block diagram showing an example of an internal construction of a manager server.

FIG. 3 shows an example of an internal construction of the manager server 100. In a memory 102 of the manager server 100, there are stored a topology information table 130 to store relationships between the adjacent packet forwarding apparatuses, a detection flow information table 140 to store flow information delivered from the packet forwarding apparatuses, an abnormal traffic database 150 as a database to diagnose abnormality in the contents of traffic, and a topology drawing calculation module 151 to display topology information. According to these information items, the manager server 100 determines by use of the CPU 100 the contents of traffic control and notifies the contents via a network interface 122 to the packet forwarding apparatuses 101, 102, and 103. At notification of the contents, the contents of notification and a point of time to withdraw the notification contents are recorded in a flow control command table 160. The topology drawing calculation module 151 is a program which runs on the CPU 12. The calculation module 151 calculates a topology drawing by use of the information items stored in the topology information table 130 and the flow information table 140 and displays the calculated drawing via a video interface 152 on a display 123.

FIG. 4 shows an example of the topology information table 130 in the manager server 100. For each packet forwarding apparatus under control of the manager server 100, the topology information table 130 includes a device IP address 131 and a connection port list 132. The topology information table 130 is statically defined according to a configuration definition or dynamically created in an automatic fashion using protocol information such as that of Simple Network Monitoring Protocol (SNMP). The method of creating the topology information table 130 is beyond the scope of the present invention. The connection port list 132 indicates, for each port of an associated packet forwarding apparatus, ports of other packet forwarding apparatuses connected thereto. In the connection port list 132, an entry in which the connection destination is indicated by a hyphen "-" means that the port is connected to, for example, a terminatory packet forwarding apparatus or a packet forwarding apparatus not under the control of the manager server 100. Specifically, for example, the row of S1 of the connection port list 132 shown FIG. 4 indicates that port 2 of the network interface 309 of the packet forwarding apparatus 101 is connected to port 5 of the network interface of S3 (the packet forwarding apparatus 103), port 4 of the network interface 309 of the packet forwarding apparatus 101 is connected to port 10 of the network interface of S2 (the packet forwarding apparatus 102), and port 8 of the network interface 309 of the packet forwarding apparatus 101 is connected to a port of a packet forwarding apparatus beyond control of the manager server 100.

FIG. 5 shows an example of the construction of the detection flow information table 140. This table is used to store the flow information reported from each packet forwarding apparatus under control of the manager server 100. For each flow identifier (ID) 141, the detection flow information table 140 includes a set of information including a device 142 indicating a packet forwarding apparatus as a report source, an input port 143 indicating a port number of the port having inputted the flow, an output port 144 indicating a port number of the port having outputted the flow, and a last update time 145. In the allocation of a flow ID, the same flow ID is assigned to the same flow by use of a source address and a destination address of the flow, a protocol number (such as TCP or UDP) of the flow, and protocol detailed information (such as TCP/UDP port information). Specifically, for example, the row of flow ID "#" of FIG. 5 indicates an event as below. An operation in which flow ID "#" is inputted from port 8 of the network interface 309 of S1 (the packet forwarding apparatus 101) and is outputted from port 4 thereof is reported from the packet forwarding apparatus 101 and the last update time is 2005/01/01 00:00:00:00.

FIG. 6 shows an example of the construction of the flow control command table 160 in the manager server 100. This table indicates a relationship between a packet forwarding apparatus, a control command, and a period of time in which the control command is being executed. Each entry thereof includes a device field 161, a control contents field 162, and a withdrawal time field 163. Specifically, for example, the first entry of FIG. 6 requests S1 (the packet forwarding apparatus 101) to keep a command "drop from 3.4.5.6 to 8.9.10.11 at port 4 outbound" effective up to 2005/01/01 00:15:00.

The manager server 100 reads the detection flow information table 140 at a fixed interval of time and makes a check to determine whether or not a new entry has been added thereto. Specifically, if the time in the last update time field 145 of any entry of the detection flow information table 140 is advanced when compared with that of the previous check, the manager server 100 determines that the flow information is to be controlled.

Similarly, the manager server 100 reads the flow control command table 160 at a fixed interval of time and makes a check to determine whether or not it is required to withdraw any flow control command. Specifically, if the time in the last withdrawal time field 163 of any entry of the flow control command table 160 is before the present time, the manager server 100 requests the packet forwarding apparatus indicated by the device field 161 of the entry to withdraw or to stop the flow control.

Figure 7:
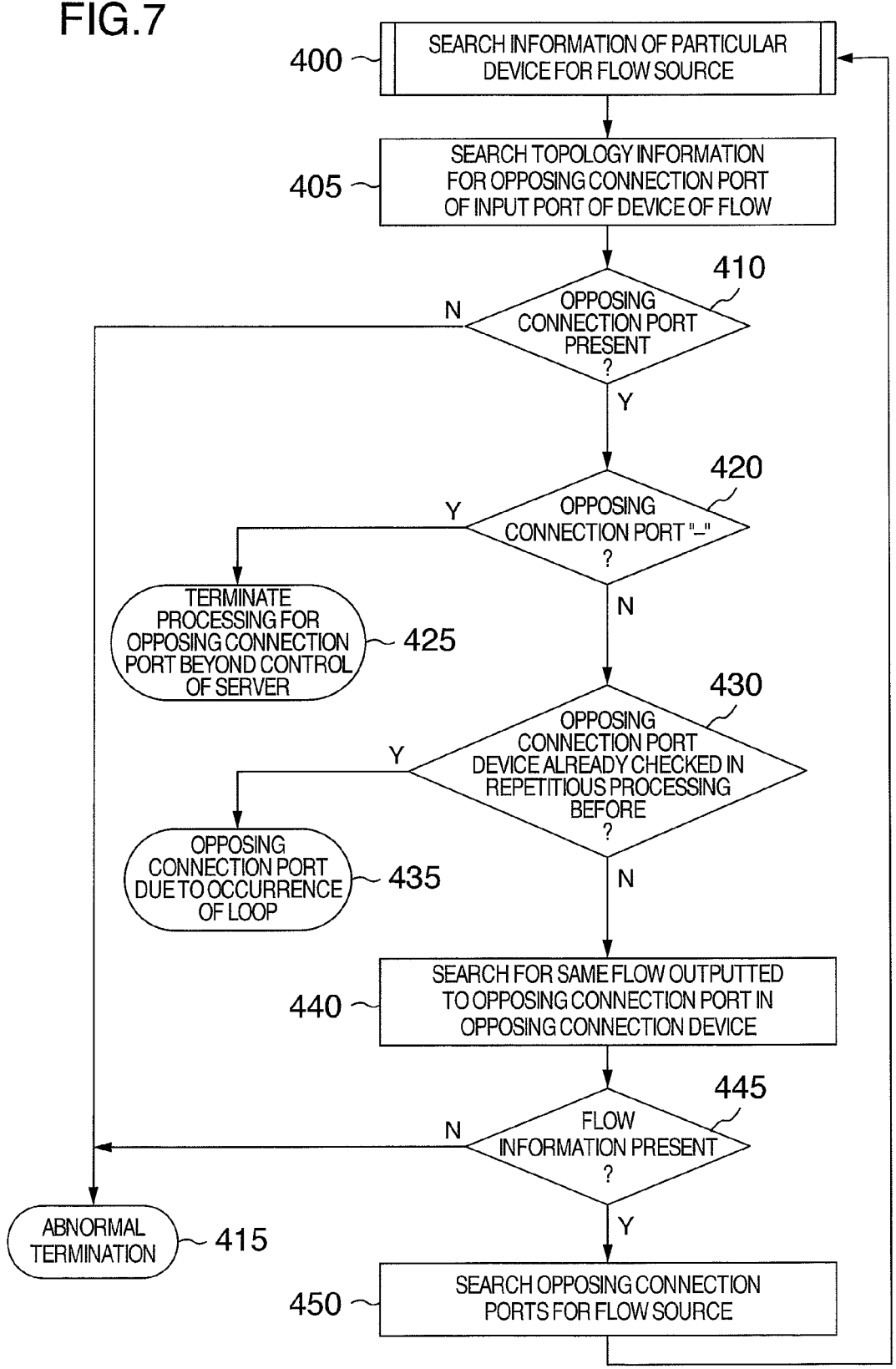
FIG. 7 is a flowchart showing an example of a flow source search algorithm.
Figure 8:
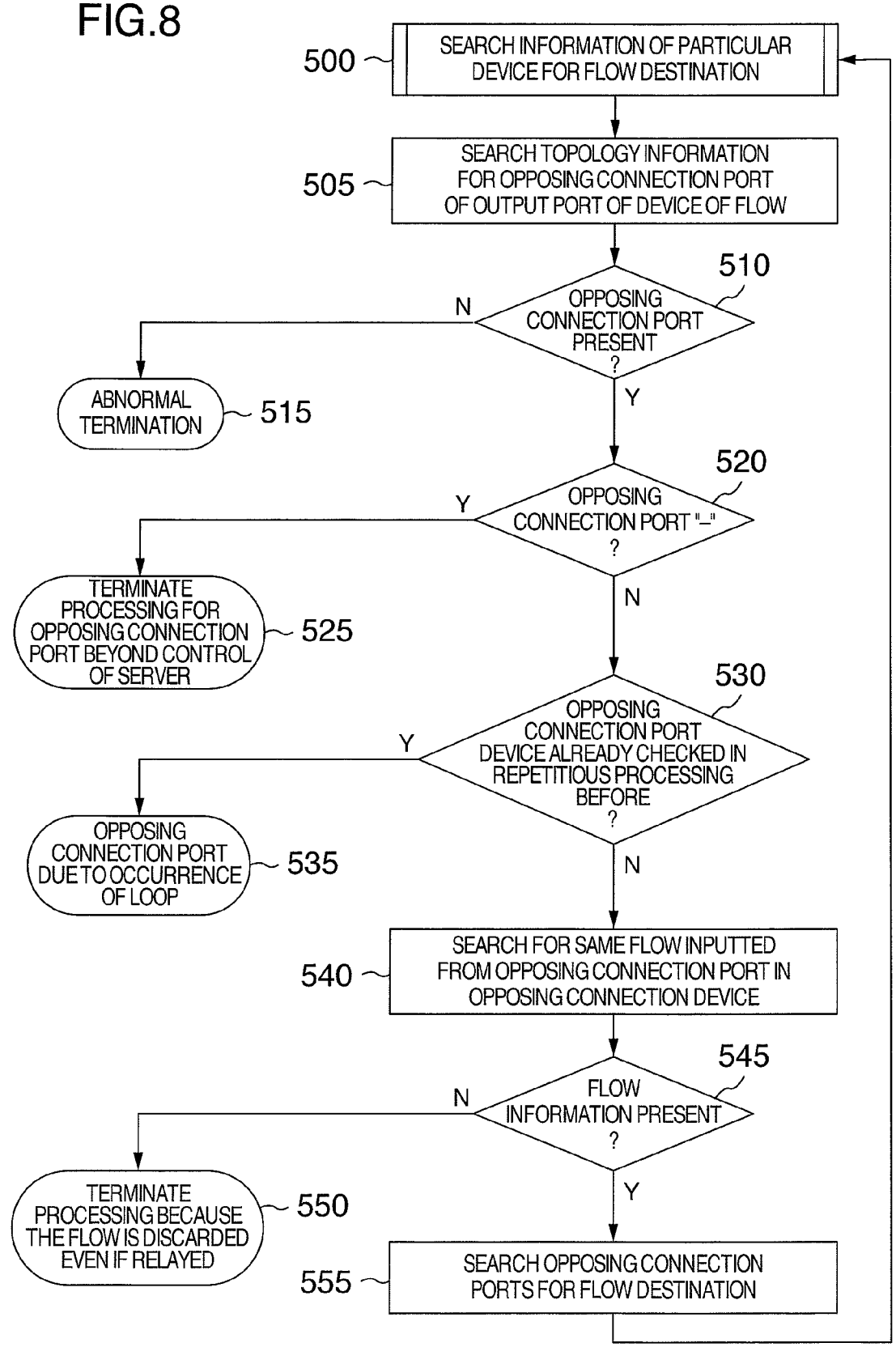
FIG. 8 is a flowchart showing an example of a flow destination search algorithm.

If it is determined that control is required for particular flow information, a search is made for the source of the flow and the destination thereof according to an algorithm shown in the flowcharts of FIGS. 7 and 8.

FIG. 7 shows an example of a flow source search algorithm executed by the CPU 121 of the manager server 100 using the information in the memory 120.

In an operation to determine a source of flow information received from a packet forwarding apparatus, a search is made for the input port of the flow information by checking the input port field 143 of the detection flow information table 140 shown in FIG. 5. A search is made through the topology information table 130 for the device port information of the opposing connection port (input source) of the input port (step 405). Specifically, the operation will be described by use of data shown in FIGS. 4 and 5. For example, for device S1 (the packet forwarding apparatus 101) in FIG. 5, flow ID "#1" is inputted from port 8 of device S1. In FIG. 4, the opposing connection port of port 8 of device S1 is "-". It is therefore recognized that the device port information (input source) of the opposing connection port is "-" for flow ID "#1". For device S2 (the packet forwarding apparatus 102), flow ID "#1" is inputted from port 10 of the device S2. In FIG. 4, the connection destination of port 10 of device S2 is port 4 of device S1. It is therefore recognized that the device port information (input source) of the opposing connection port is port 4 of the device S1 for flow ID "#1".

If the opposing connection port does not exist (No in step 410), the processing is abnormally terminated (step 415).

Even in a case in which the opposing connection port exists (Yes in step 410), if the device port information is "-" (Yes in step 420), it is determined that the flow is from other than the packet forwarding apparatuses under control of the manager server 100 and hence the search processing is terminated (step 425). For flow ID "#1" of the device S1, the processing is terminated at this point.

If the device port information is other than (No in step 420), "N" results in step 430 for the first search. Therefore, the search is made through the detection flow information table 140 shown in FIG. 5 for flow information which has the same flow ID and which is outputted to the device port of the opposing connection port (step 440). Specifically, the operation will be described by use of data of FIG. 5. For flow "#1" of device S2, it is recognized that the same flow ID "#1" is inputted from port 8 of the device S1 and is outputted from port 4 thereof. Moreover, as shown in FIG. 4, since the opposing connection port (input source) of port 8 is "-", it is recognized that the opposing connection port (input source) is "-" for the device S1.

In a case wherein there exists flow information which has the same flow ID and which is outputted to a device port of the opposing connection port (Yes in step 445), a search is made through the opposing connection ports for the source of the flow ID (step 450). Specifically, the operation will be described by use of data of FIG. 4 and FIG. 5. For flow ID "#1", the opposing connection port (input source) is port 4 of device S1 for device S2. For device S1, the input source of the flow having flow ID "#1" is port 8. The opposing connection port of port 8 of device S1 is "-". Therefore, the source of flow ID "#1" is determined as port 8 of device S1.

Thereafter, the search processing is repeatedly and similarly executed for subsequent flow information. In the data of FIG. 5, the search processing is executed for flow ID "#2".

Even in a case in which the device port information is other than "-" (No in step 420), if it is detected as a result of repetitious execution of the search processing that the flow has passed one and the same packet forwarding apparatus two times (Y in step 430), it is determined that the flow forms a loop and hence the search processing is terminated (step 435). For example, if the processing is executed for flow ID "#3" according to the flowchart of FIG. 7, the opposing connection port for device S1 is port 5 of device S3 and the opposing connection port for device S3 is port 13 of device S2. Therefore, the opposing connection port for device S2 is a port of device S1. Since device S1 appears twice as the source of the flow to device S1, it is determined that flow ID "3#" forms a loop. In this regard, the function of the CPU 121 to detect a loop formed as above is also called as a loop detection part.

FIG. 8 shows an example of a flow output destination search algorithm executed by the CPU 121 of the manager server 100 using the information in the memory 120.

In an operation to determine an output port (destination) of flow information received from a packet forwarding apparatus, a check is made for the output port of the flow information by referring to the output port field 144 of the detection flow information table shown in FIG. 5. For the output port thus determined, a search is made through the topology information table 130 shown in FIG. 4 for the device port information of the opposing connection port (output destination; step 505). Specifically, the operation will be described by use of the data of FIGS. 4 and 5. For example, for device S1 (the packet forwarding apparatus 101) in FIG. 5, flow ID "#1" is outputted from port 4 of device S1. In FIG. 4, the connection destination of port 4 of device S1 is port 10 of device S2. It is consequently determined that the port information (output destination) of the opposing connection device of flow ID "#1" is port 10 of device S2.

If the opposing connection port (output destination) does not exist (No in step 510), the processing is abnormally terminated (step 515).

Even in a case in which the opposing connection port (output destination) exists (Yes in step 510), if the device port information is "-", it is determined that the flow is outputted to other than the packet forwarding apparatuses under control of the manager server 100. Therefore, the search processing is terminated (step 525).

If device port information is other than (No in step 520), "N" results in step 530 for the first search. Therefore, a search is made through the detection flow information table 140 shown in FIG. 5 for the flow information which has the same flow ID and which is inputted from the device port of the opposing connection port (output destination; step 540). Specifically, the operation will be described by use of the data of FIG. 5. It can be recognized that the same flow ID "#1" is inputted from port 10 of device S2 and is outputted from port 1 thereof. As shown in FIG. 4, the connection destination port of port 1 is "-", and hence the opposing connection port (output destination) is "-" for device S2.

If there exists flow information which has the same flow ID and which is inputted to the device port of the opposing connection port (Yes in step 545), a search is made through the opposing connection ports for the destination of the flow ID (step 555). Specifically, the operation will be described by use of the data of FIG. 4 and FIG. 5. For flow ID "#1", the opposing connection port (output destination) of device S1 is port 10 of device S2 and the opposing connection port (output destination) of device S2 is "-". Therefore, it is determined that the output destination is device S2.

Thereafter, the search processing is similarly executed for subsequent flow information. For the data of FIG. 5, the search processing is executed for flow ID "#2".

If there does not exist flow information which has the same flow ID and which is inputted to the device port of the opposing connection port, it is determined that the packet does not flow through the packet forwarding apparatus, and hence the search processing is terminated (step 550).

Even in a case wherein the device port information is not "-" (No in step 520), if it is detected as a result of repetitious execution of the search processing that the flow has passed one and the same packet forwarding apparatus twice (Y in step 530), it is determined that the flow forms a loop. Therefore, the search processing is terminated (step 535).

Figure 9:
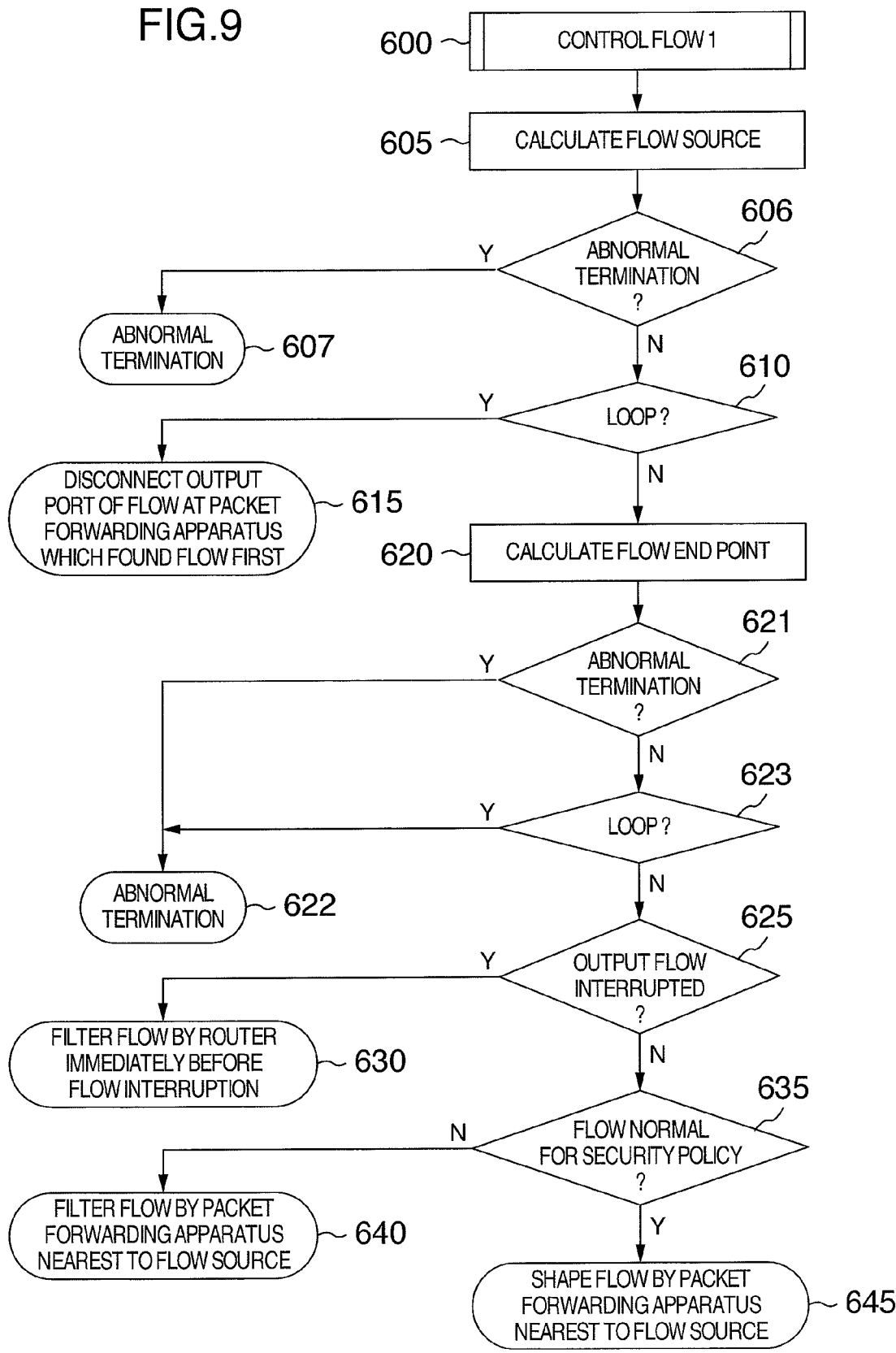
FIG. 9 is a flowchart showing an example of a traffic control algorithm.

FIG. 9 shows an example of a traffic control algorithm executed by the CPU 121 of the manager server 100 using the information of the memory 120 to issue a traffic control request to the associated packet forwarding apparatus. To transmit the traffic control request, a destination address is determined according to the device address 131 of the topology information table shown in FIG. 4. To transmit the request, there may be used a protocol such as SNMP (Simple Network Management Protocol), a protocol of Telnet, or a protocol of Extensible Markup Language (XML). To issue the traffic control request, a valid period of the traffic control command is determined, and then the destination of the control command, the contents thereof, and a point of time when the control command is withdrawn or cancelled are recorded in the flow control table 160 shown in FIG. 6 with a correspondence established therebetween.

If occurrence of a loop is detected as a result of the flow source search processing (step 605, FIG. 7), the packet forwarding apparatus having first detected the flow, namely, the packet forwarding apparatus selected in step 400 of FIG. 7 for the detection of occurrence of the loop is instructed to disconnect the output port of the flow ID under consideration (step 615). In the example of FIG. 5, flow ID "#3" corresponds to the case. Therefore, the packet forwarding apparatus S1 having first detected flow ID "#3" executes a control command "drop from 3.4.5.6 to 8.9.10.11 at port 4 outbound" to stop the outputting of flow ID "#3".

As a result of the flow destination search processing (step 620, FIG. 8), if occurrence of a loop is detected (Y in step 623), the processing is similarly executed as described above.

If it is determined as a result of the flow destination search processing that the output flow does not pass through a particular packet forwarding apparatus (Y in step 625), a filter setting operation is conducted in a forwarding apparatus on the upstream side of the pertinent forwarding apparatus to discard the flow (step 630). In the example of FIG. 5, flow ID "#4" corresponds to the case. Therefore, the apparatus S2 in which the relaying operation of flow ID "#4" is stopped executes a control command "drop from 4.5.6.7 to 9.10.11.12 at port 13 outbound" to stop the outputting of flow ID "#4".

In other than the cases described above, it is possible to determine from where the flow is inputted and to where the flow is outputted. The manager server collates the contents of the flow with the abnormal traffic database 150 to determine whether or not the flow is normal for the security policy (step 625). For abnormal traffic, a filter setup operation is conducted so that the packet forwarding apparatus as the flow source discards the traffic (step 640). For normal traffic, a shaper setup operation is conducted so that the packet forwarding apparatus as the flow source narrows the band of the traffic (step 645). In conjunction with the present case, if it is assumed that flow ID "#1" is normal traffic, the apparatus S1 as the flow source executes a control command "limit from 2.3.4.5 to 7.8.9.10:http at port 8 within 10 Mbps inbound" to narrow the band of flow ID "#1".

Figure 10:
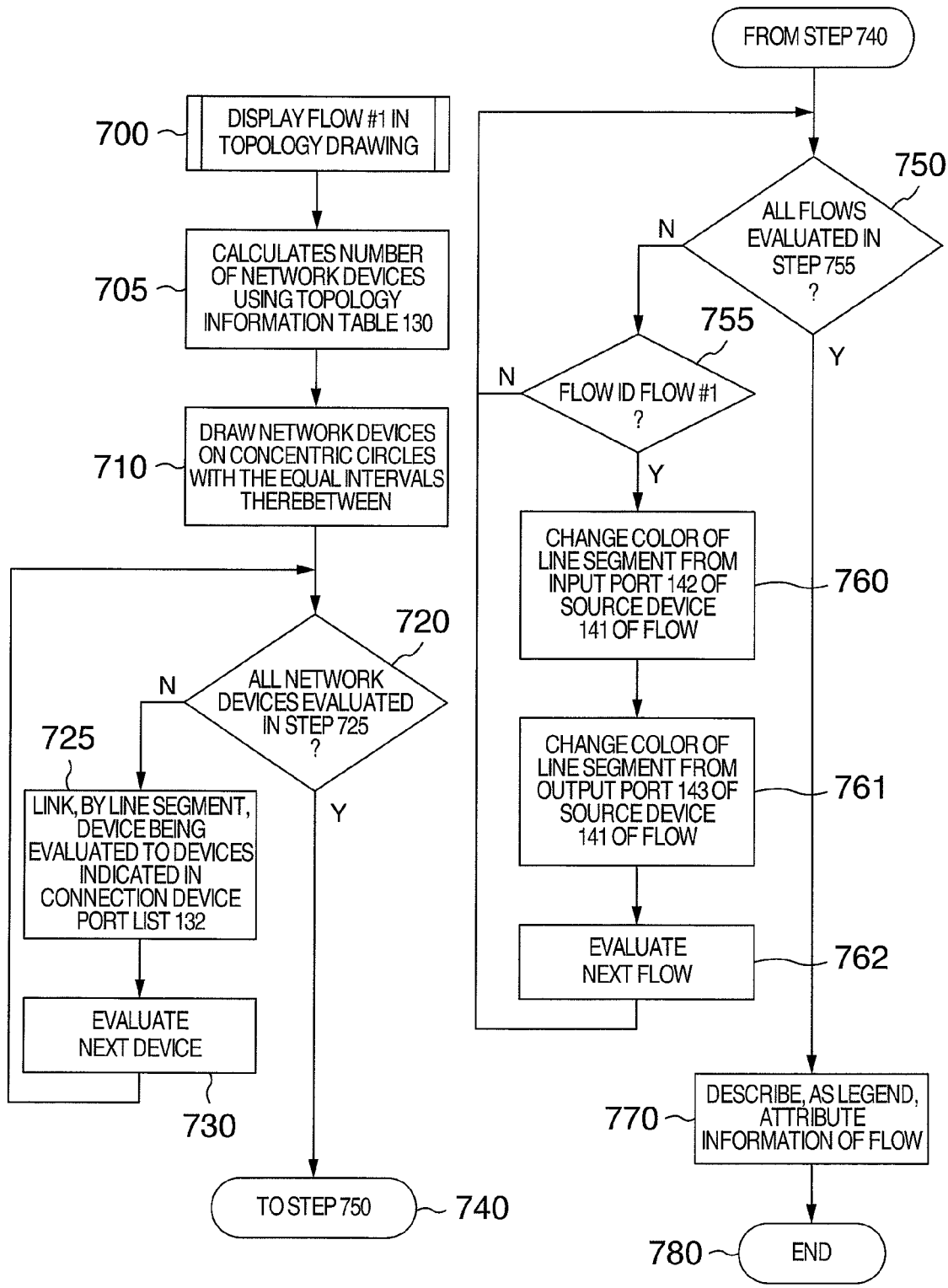
FIG. 10 is a flowchart showing an example of a flow topology drawing algorithm.
Figure 11:
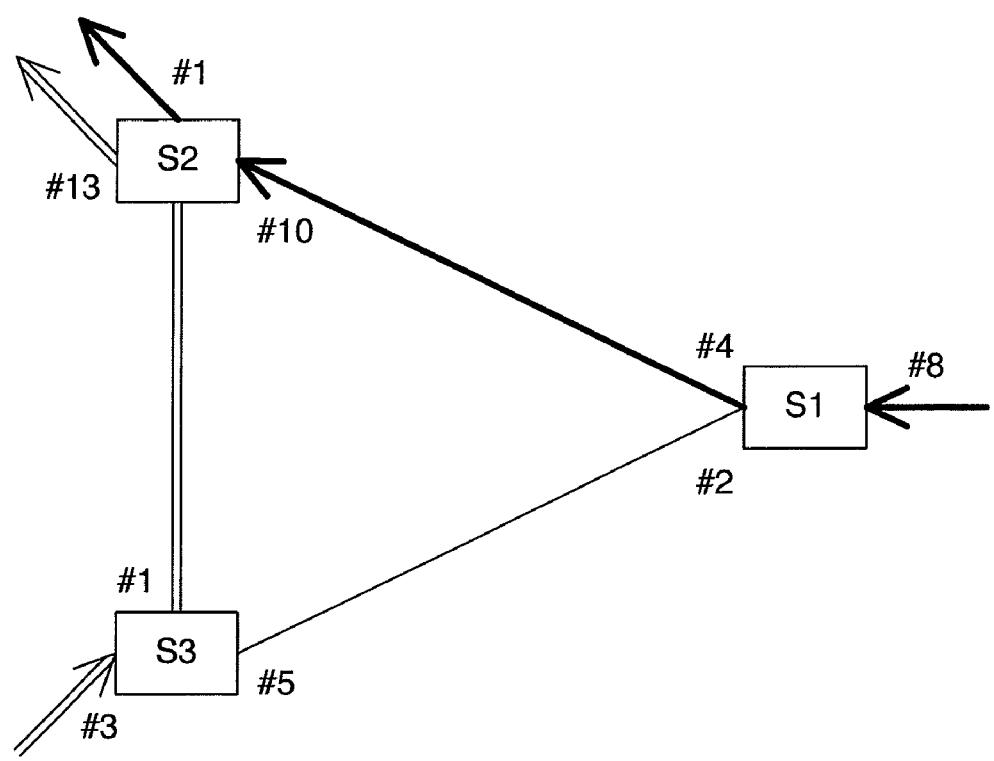
FIG. 11 is a diagram showing an example of the flow topology drawing.

FIG. 10 shows an example of a flow topology drawing algorithm executed by the CPU 121 of the manager server 100 using the information in the memory 120. Description will now be given of an example in which the topology drawing is produced for flow ID "#1" according to the information of the topology information table 130 shown in FIG. 4 and that of the detection flow information table 140 shown in FIG. 5. FIG. 11 shows an example of the topology drawing produced according to FIG. 10.

First, the topology drawing calculation module 151 produces a network topology drawing according to the information of the topology information table 130. The calculation module 151 calculates the number of packet forwarding apparatuses (network devices) which exist in the table 130 and which are targets of the management (step 705) and produces the topology drawing by placing the network devices on the concentric circles with an equal interval therebetween (step 710). In FIGS. 4 and 5, the number of packet forwarding apparatuses is three.

Next, In the drawing of the respective packet forwarding apparatuses produced in step 710, line segments are drawn for each port and port numbers of the packet forwarding apparatuses are indicated at both ends of the line segment (step 725). For a packet forwarding apparatus which does not have a connection device and which is not under the control of the manager server, the line segment is extended from the packet forwarding apparatus in a radial direction of the concentric circle. The processing is sequentially executed for each packet forwarding apparatus (steps 730 and 720).

According to the flow ID field 141 of the detection flow information table 140, flow information belonging to flow ID "#1" is extracted from the detection flow information table 140 (step 755).

The line segments from the input port 143 of the apparatus 142 associated with the extracted flow information are drawn again with a color different from that of the line segments drawn in step 725 (steps 760 and 761). The processing is sequentially executed for each flow (steps 762 and 750).

The result of collation between the contents of flow ID "#1" and the abnormal traffic database 150 is displayed together with the starting point (source) of the flow obtained in the processing shown in FIG. 7, and an end point (destination) thereof obtained in the processing shown in FIG. 8 (step 770). It is also possible to display the contents of control, for example, control commands and an associated flow ID with a correspondence established therebetween.

According to the configuration described above, by combining the flow information with the topology information, the network manager server can control traffic at an efficient place such as the flow starting point. Even if a plurality of types of traffic control are employed, the load imposed on the calculation resource of the forwarding apparatus is small. It is possible to map the flows onto the network topology drawings. As a result, any flow causing an abnormality can be visibly presented for each flow types, each abnormality cause, or the like. According to the combination of the flow information and the topology information, any flow forming a loop can be detected. Also, since traffic actually not relayed to any device can be detected according to the combination of the flow information and the topology information, it is possible to prevent unnecessary consumption of bands due to such traffic. The event in which the unnecessary traffic control is kept remained can also be prevented.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A manager server connecting to a plurality of packet forwarding apparatuses each of which includes a plurality of ports, the manager server comprising:
    a topology information storage unit for storing connective relation information among the ports of the packet forwarding apparatuses, via which the packet forwarding apparatuses are connected with each other; and
    a processor unit provided with a flow information receiving section for receiving, from each of the packet forwarding apparatuses, flow information identifying traffic flow and input port information indicating an input port via which the flow is input to the packet forwarding apparatuses; and a flow starting point searching section for searching for a starting point of a traffic flow according to the input port information and the flow information received by the flow information receiving section and the connective relation information of the ports stored in the topology information storage,
    wherein the flow starting point searching section searches the connective relation information for a first port matching first input port information corresponding to first flow information received from a first packet forwarding apparatus by the flow information receiving section and searches the connective relation information for a second port matching second input port information corresponding to first flow information received, by the flow information receiving section, from a second packet forwarding apparatus as a connection destination of the first port.

2. A manager server according to claim 1, wherein the flow starting point searching section determines, if a connection destination of the second port matching the second input port information is not connected to the manager server, that the second packet forwarding apparatus is a starting point of the traffic flow.

3. A manager server according to claim 1, further comprising a control instructing section for instructing the starting point determined by the flow starting point searching section to control traffic corresponding to the flow information received by the flow information receiving section.

4. A manager server, connecting to a plurality of packet forwarding apparatuses each of which includes a plurality of ports, the manager server comprising:
    a topology information storage for storing connective relation information among the ports of the packet forwarding apparatuses, via which the packet forwarding apparatuses are connected with each other;
    a flow information receiving section for receiving, from each of the packet forwarding apparatuses, flow information identifying traffic flow and output port information indicating an output port via which the flow is output from the packet forwarding apparatuses; and a flow end point searching section for searching for an end point of a traffic flow according to the output port information and the flow information received by the flow information receiving section and the connective relation information of the ports stored in the topology information storage, wherein the flow end point searching section searches the connective relation information for a first port matching first output port information corresponding to first flow information received from a first packet forwarding apparatus by the flow information receiving section and searches the connective relation information for a second port matching second output port information corresponding to first flow information received, by the flow information receiving section, from a second packet forwarding apparatus as a connection destination of the first port.

5. A manager server according to claim 4, wherein the flow end point searching section determines, if a connection destination of the second port matching the second output port information is not connected to the manager server, that the second packet forwarding apparatus is an end point of the traffic flow.

6. A manager server according to claim 4, further comprising a control instructing section for instructing, if the flow end point searching section fails to search the second output information corresponding to the first flow information, the first packet forwarding apparatus to control traffic corresponding to the first flow information.

7. A manager server connecting to a plurality of packet forwarding apparatuses each of which includes a plurality of ports, comprising:

a topology information storage unit for storing connective relation information among the ports of the packet forwarding apparatuses, via which the packet forwarding apparatuses are connected with each other;

a processor unit provided with a flow information receiving section for receiving, from each of the packet forwarding apparatuses, flow information identifying traffic flow and input port information indicating an input port via which the flow is input to the packet forwarding apparatuses; and a loop detecting section for searching the connective relation information for a second port matching first input port information corresponding to first flow information received from a first packet forwarding apparatus by the flow information receiving section, searching the connective relation information for a fourth port matching third input port information corresponding to the first flow information received form a second packet forwarding apparatus as a connection destination of the second port, searching the connective relation information for a sixth port matching fifth input ort information corresponding to the first flow information received from a third packet forwarding apparatus as a connection destination of the fourth port, and determining that a loop has been formed if a connection destination of the sixth port is the first or second packet forwarding apparatus.

* * * * *